United States Patent [19]
Rehm

[11] 3,962,999
[45] June 15, 1976

[54] HEAT TRANSFER FLUID HEATER WITH CONTINUOUSLY FLUSHED VENT AND DRAIN

[75] Inventor: Gustav A. Rehm, Milwaukee, Wis.

[73] Assignee: Aqua-Chem, Inc., Milwaukee, Wis.

[22] Filed: Sept. 9, 1974

[21] Appl. No.: 504,495

[52] U.S. Cl. .................................. 122/248; 165/71
[51] Int. Cl.² ........................................ F22B 37/12
[58] Field of Search .............. 165/71; 122/202, 248; 62/475, 85

[56] References Cited
UNITED STATES PATENTS

| | | | |
|---|---|---|---|
| 2,400,620 | 5/1946 | Zwickl | 62/85 |
| 3,013,404 | 12/1961 | Endress et al. | 62/85 X |
| 3,276,216 | 10/1966 | Papapanu | 62/85 |
| 3,810,447 | 5/1974 | Grainger | 122/248 |
| 3,825,060 | 7/1974 | Heller et al. | 165/71 X |

*Primary Examiner*—William E. Wayner
*Assistant Examiner*—William E. Tapolcai, Jr.
*Attorney, Agent, or Firm*—Fred Wiviott

[57] ABSTRACT

A helical coil of tubing is disposed in a furnace for heat transfer fluid to circulate therethrough and absorb heat. The upper side of each coil loop is connected to a vent system which transports a portion of the circulated fluid. The vent system is continuously flushed of vapors and air which might otherwise be trapped in the tubing. The lower sides of the coil loops are connected to a drain system through which fluid flows continuously during heater operation to keep the drain clean of settlings.

22 Claims, 4 Drawing Figures

HEAT TRANSFER FLUID HEATER WITH CONTINUOUSLY FLUSHED VENT AND DRAIN

BACKGROUND OF THE INVENTION

A known type of heat transfer fluid heater conducts the fluid through a helical tubular coil which has its axis horizontally disposed. The coil may define a furnace chamber or it may be located in such chamber. In any case, the fluid absorbs heat as it flows through the coil under the influence of a pump. By suitable piping, the outlet of the coil may be connected to a remotely situated heat exchanger which yields heat to anything one desires to heat. Typical uses are for supplying heat to chemical process equipment such as reactors, autoclaves, distillation columns, reboilers, mixers and dryers. Other examples of uses are to supply heated fluid to coils for de-icing or simply to heat space.

Usually the temperature requirements of the process in which the heat is yielded dictates the nature of the fluid that is chosen for transferring heat. For high temperature applications, fluids derived from petroleum are usually used because some are available which have desirable properties of high heat transfer coefficients, high boiling points, good thermal capacity and lack of corrosiveness. However, at high temperatures petroleum derivatives and other organic heat transfer fluids deteriorate through either cracking or oxidation. Sometimes volatile hydrocarbons are produced which may cause vapor lock in the system. Cracking also produces nonvolatile materials or polymers which increase fluid viscosity and cause deposition of coke or carbon on the inside of the heater coil surfaces. The deposits have an insulating quality which often results in the tubes becoming overheated such that premature failure occurs. One approach to ridding the tubing of deposits is to force pistons known as "pigs" through the coil for scraping off the sediment. This is disadvantageous because it requires the system to be opened periodically.

Another problem with horizontal tube fluid heaters is that of purging the fluid system of water vapor, air and other gases. One source of water results from the need to make a hydrostatic pressure test on the system during manufacture at the factory or on site after some maintenance has been performed. Despite efforts to blow the water out, there is always some residual that settles in the lower parts of the loops of the tubular helix. Moreover, there are occasions when the fluid heater must be inactivated for a period of time and this calls for forcing all of the fluid out of the coil. Unfortunately, there is always some residual fluid remaining in the lower portion of the coil loops and, heretofore, there has been no satisfactory way of removing it or draining it. Another problem is that when gases and vapors rise to the upper portions of the coil loops, the absence of fluid in such portions results in localized overheating of the coil and accelerated degradation of the residual fluid.

SUMMARY OF THE INVENTION

The present invention provides solutions to the foregoing and other problems. The invention pertains to a helical tubular coil with its axis horizontally disposed in a heating chamber and to any heating coil in which flowing fluid ascends and descends as it flows therethrough. The outlet of the coil is the beginning of a closed loop which includes a heat exchanger or heat yielding device and a pump whose inlet is supplied with fluid returned from the heat yielding device and whose outlet is connected to the inlet of the heater coil. The top or uppermost region of each coil convolution or loop is connected to a continuously flushed vent system through which a proportionate share of the fluid to be heated flows. The bottom of each coil loop is similarly connected to a continuously flushed drain system which is below the general level of the coil. These systems are preferably comprised of tubing formed in a sinuous configuration to account for expansion and to provide for interconnection of all the coil loops. The vent system provides for positive venting during initial filling of the coil. The drain system enables complete draining of the coil when desired.

Accordingly, objects of the invention are to provide a heat transfer fluid heater coil with auxiliary continuously flushed vent and drain systems wherein the vent system will separate air and water vapor from the fluid during heater operation and the drain system will enable complete draining of the coil.

A further object is to provide for substantial pressure being applied to the vent and drain systems to assure continuous purging of the systems during heater operation.

Other objects are to provide a vent system which enables continuous venting while the heater coil and the entire system are being filled with original, make-up or replacement fluid and which assures that the entire volume in each coil loop or convolution will be filled with fluid during heater operation.

Another object is to inhibit accumulation of fluid degradation products on the internal surfaces of the coil loops. An adjunct of this object being to inhibit substances having insulating qualities from accumulating in the tube loops so that there is intimate fluid-to-tubing contact which enhances heat conduction by the fluid from the tubing to thereby prevent overheating and premature deterioration of the coil.

How the foregoing objects and other more specific objects of the invention are achieved will appear in the course of the ensuing description of an illustrative embodiment of the invention which will be made in reference to the drawings.

DESCRIPTION OF A PREFERRED EMBODIMENT

Figure 1:
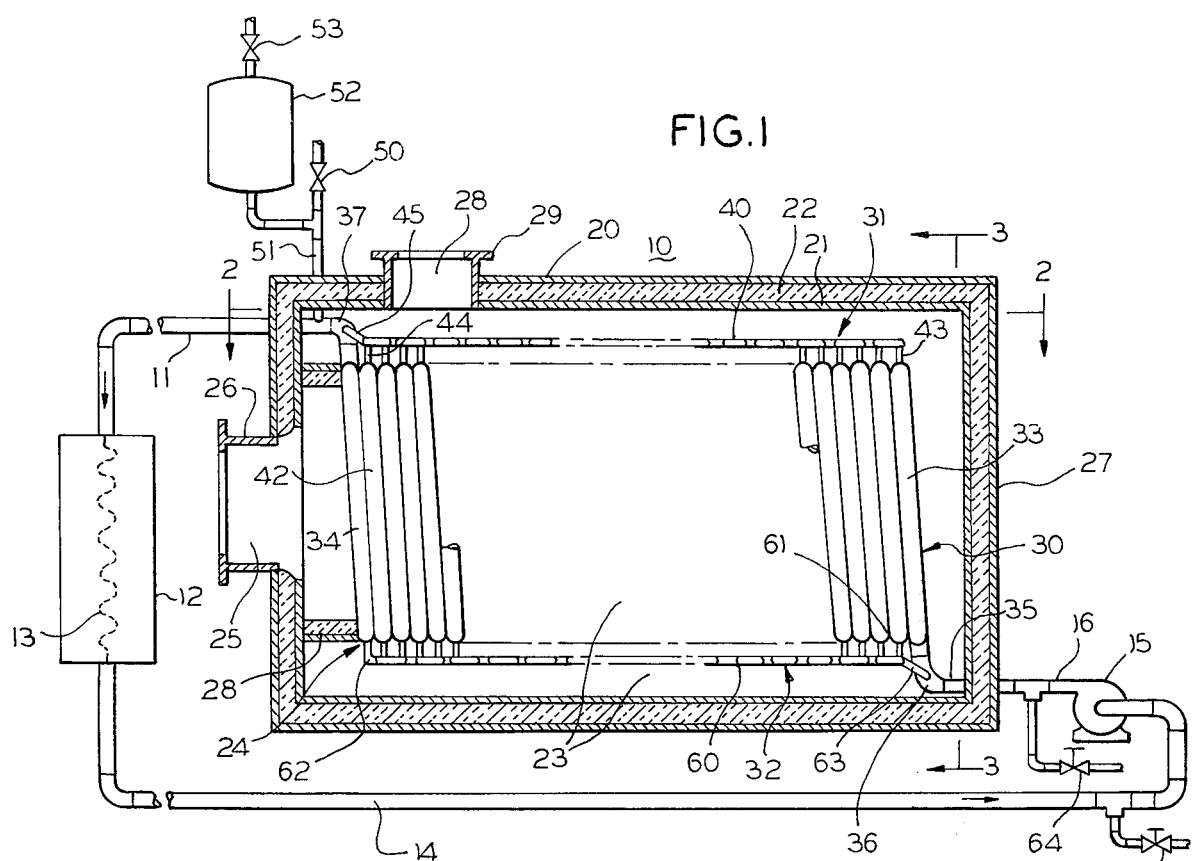
FIG. 1 is a vertical longitudinal section, partly schematic, of a heat transfer fluid heater in which the invention is embodied.

In FIG. 1, the improved heat transfer fluid heater is generally designated by the reference numeral 10. Hot fluid is discharged from the heater through an outlet pipe 11 which leads to a heat exchanger or heat yielding device 12. The device is symbolic of any device used for providing heat for such purposes as space heating, chemical processing, distilling or autoclaving to name but a few. Thus, the heat transfer device is provided with a coil 13 for yielding heat to its environment. Fluid from which heat has been extracted returns to the heat transfer fluid heater 10 by way of a return pipe 14 which connects to the inlet of a pump 15 that circulates heat transfer fluid through the entire system. The discharge side 16 of the pump constitutes the inlet of the fluid heater.

The fluid heater apparatus 10 comprises a furnace including an outer cylindrical metal shell 20 and an inner metal shell 21. Insulating material 22 is disposed between the two shells. The inner shell defines a furnace chamber 23 which is occupied by an improved heater coil system which is generally designated by the reference number 24 and which will be described in detail below. Furnace chamber 23 has an opening 25 defined by a flanged thimble 26. A suitable fuel burner, not shown, may be mounted on thimble 26. The burner may be conventional in that it projects fuel and air for combustion generally from opening 25 toward the rear wall 27 of the furnace. The hot gaseous combustion products are constrained by an annulus 28 to flow through the inside of the heater coil assembly 24 and to the rear of the furnace and then return in a reverse direction on the outside of the coil and the gases are ultimately conducted through an opening 28 in a thimble 29 which couples the interior of the furnace to an exhaust stack, not shown.

As can be seen in FIG. 1, the heater coil assembly 24 is comprised of three major components, namely, a main heat transfer coil 30, a vent system 31 and a drain system 32. The coil 30 is formed as a closely wound helix of metal tubing wherein each coil loop or convolution has, in this case, substantially uniform diameter. As illustrated in FIG. 1, coil 30 has its axis horizontal but it should be understood that if the coil axis is inclined substantially from horizontal as in some furnace designs, the coil loops may still have high and low portions which may create venting and draining problems that can be obviated by use of the new vent and drain systems disclosed herein. Thus, it will be understood that reference to the coil axis being generally horizontal covers the case where the axis is truly horizontal and cases where the axis is inclined and has horizontal and vertical components.

For the sake of discussion, the first coil loop into which the cool fluid is introduced to begin the heating process in the coil is marked with the number 33 and the last loop on the outlet side is marked 34. As can be seen in the various figures, the first coil loop 33 at the inlet end is formed with an axially extending inlet 35 which connects with and is supplied from the outlet of pump 15. Inlet 35 has an elbow portion 36 which is continuous with the first loop 33 in the illustrated embodiment. The last coil loop 34 is similarly formed to terminate in an elbow 37 through which fluid heated in coil 30 is discharged to the outlet pipe 11.

Figure 2:
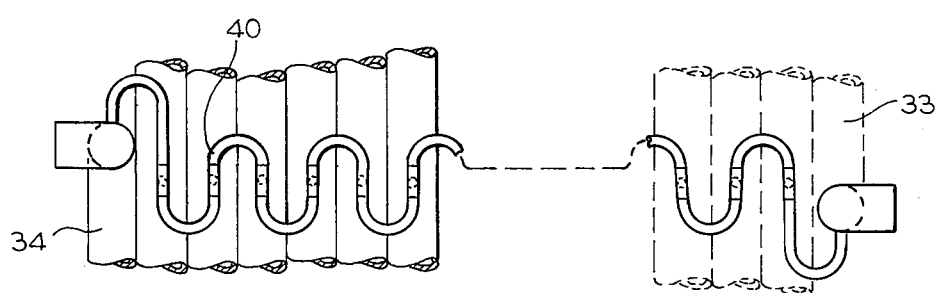
FIG. 2 is a plan view of the vent system taken along a line corresponding with 2—2 in FIG. 1.
Figure 3:
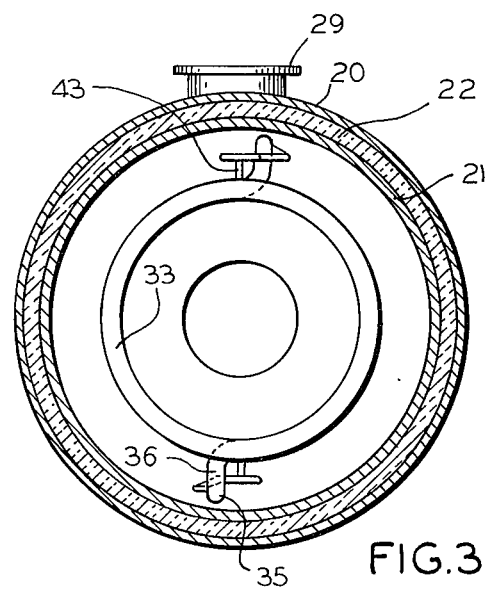
FIG. 3 is an end elevation view of the interior of the fluid heater taken in a direction corresponding with the line 3—3 in FIG. 1.

The new vent system 31 comprises tubing 40 which, as can be seen in FIG. 2, is formed in a sinuous configuration to accommodate thermal expansion and contraction. The upper portions of each main coil loop beginning with loop 33 and ending with the next to the last loop 42 have short tubes such as 43 and 44 respectively, which connect into sinuous shaped tubing 40, constituting a vent conduit with substantially uniform periodicity. It will be evident that any air or vapor which might otherwise collect in the upper portions of the main coil loops such as 33 will rise through the plurality of short tubes 43 into the vent tubing 40 to be carried away under the influence of a portion of the input fluid which flows through the sinuous vent conduit 40. At the discharge end, vent conduit 40 has an extension 45 which connects into elbow 37 and, hence, into outlet pipe 11.

The sinuous shaped tubing or vent conduit 40 may have an internal diameter less than or greater than main coil tubing 30. The desired proportionality between the flow in main coil 30 and vent conduit 40 can be established by selecting the relative internal diameters of the tubing and vent conduit. For instance, if the vent conduit tubing 40 is made larger than main coil tubing 30, flow may still be properly proportioned in the vent conduit by thereby restricting flow in the extension 45 at the terminal end of the vent conduit. In any event, the first short tube 43 is connected to the first heater coil loop 33 such that substantially pump pressure is applied to the inlet end of the vent conduit to assure positive flow of a portion of the fluid through the vent conduit for inhibiting settling of solid degradation products. Air, other gases and water vapor are induced to rise from the upper portions of the coil loops so they remain filled with fluid.

Air and vapor may be relieved from the system continuously by an automatically controlled bleeder valve 50 which connects by means of a pipe 51 to the coil outlet. Valve 50 may also be manually operable and opened periodically to relieve air and vapor collected in the uppermost parts of the system. Valve 50 may be opened to relieve air from the system when it is being filled or supplemented with heat transfer fluid. The system may also be provided with an expansion tank 52 on which there is a bleeder valve 53 for relieving air, other gas and water vapor from the system.

Attention is now invited to the new continuously flushed drain system 32. It comprises a tubular drain conduit 60 which is formed in a sinuous configuration similar to vent conduit 40. The lower portions of the main coil 30 loops each have short tubes such as tube 61 on the second loop at the input end and tube 62 on the last loop 34 at the output end for connecting the main tube loops to drain conduit 60. There are also short tubes between lower portions of the other coil loops and drain conduit 60. An extension tube 63 at the input end of the drain conduit 60 connects the latter to the inlet region of the first loop 33 and, accordingly, to the output of pump 15. It will be evident then that pump pressure is applied to drain conduit 60 to cause a portion of the heat transfer fluid to flow therethrough. This positive pressure and flow assures that any settlings from the several main coil 30 loops will be continuously flushed from the drain line 60. At the same time the flow of fluid in drain conduit 60 or in vent conduit 40 keeps the conduit tubing within fluid temperature or slightly above and prevents chemical breakdown of the fluid therein. In this embodiment, the proportionate share of fluid delivered to drain conduit 60 exits through the plurality of short tubes into the respective lower portions of the heater coil loops and gets into the mainstream of the coil.

The drain conduit 60 facilitates completely draining the individual loops which comprise the main heating coil 30. The ability to completely drain in a simple fashion is especially important in connection with removing water which is used for making a hydrostatic pressure test on the apparatus during manufacture. For draining the system it is only necessary to let atmospheric air displace fluid which is in the tubing. This may be done by opening vent valve 50 and simultaneously opening a drain valve 64 which is connected by suitable piping to the outlet side of pump 15.

It should be understood that the vent system 31 and the drain system 32 may be located outside of the heating chamber 24 of the furnace as well as on the inside as illustrated and as described above. Where that choice is made, it is necessary to extend the length of the individual tubes such as 43 and 44 leading to the vent conduit tubing 40 and 61 and 62 leading to the drain conduit tubing 60.

Figure 4:
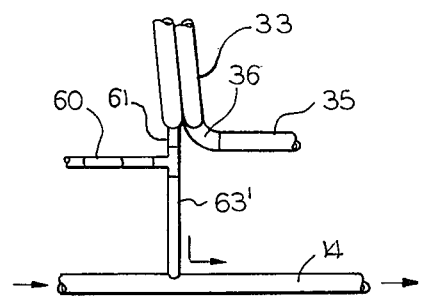
FIG. 4 is a fragmentary view of a portion of FIG. 1 to illustrate an alternative form of the invention.

In FIG. 1, the drain conduit inlet extension 63 connects into elbow 36 so as to receive fluid at the output pressure of pump 15. In this arrangement, the drain conduit 60 is flushed by fluid flow in a direction from the pump outlet to the lower portions of the intermediate loops and to the last loop 34 of main coil 30. Reverse flushing may also be achieved by connecting conduit extension 63 directly to return pipe 14 on the inlet side of pump 15 as shown in FIG. 4 fragmentary view where the same parts as in FIGS. 1 and 2 have the same reference numbers except that conduit extension 63 is marked 63'. In this arrangement, some fluid for flushing the drain conduit 60 is derived from each of the loops of main coil 30 and the general flow direction in the drain conduit is opposite to the direction of flow in FIG. 1. With this alternate connection of extension 63' to return line 14, the whole system can be drained with a valve 65 which leads to return line 14 on the input side of pump 15. Like the previously described embodiment, this arrangement provides for continuous flushing of the drain conduit but a fraction of fluid flows from each coil loop to the drain conduit instead of from the conduit to the lower portion of each coil loop.

The above described embodiment of the invention has the vent conduit 40 and the drain conduit 60 inside of furnace chamber 23 but it should be understood that these conduits may be located outside of the furnace too. In such case, of course, the plurality of tubes which connect the conduits to either the upper or lower portions of the coil tubes must be lengthened.

In the description above, it was assumed that main coil 30 was wound of a single continuous tube. In some heat transfer fluid heaters design considerations dictate use of multiple main coils. That is, the main coils are wound simultaneously of two or more separate tubes. These coils, not shown, may be supplied from a separate pumps or a single pump. In such case, in accordance with the invention, each of the multiple main coils will be provided with its own vent system 31 and a drain system 32. This can be done easily by arranging the sinuous shaped vent and drain conduits 40 and 60 one above the other or side-by-side and extending the short branch tubes such as 43 and 61.

The new continuously flushed vent and drain systems may also be used with types of heater coils other than the helical type herein discussed. For example, the maon fluid heater coil could be one or more serpentine or sinuously shaped tubes, not shown, connected singly or in parallel and in a plane parallel with a vertical longitudinal plane through the furnace such as to create lower and upper bends in which settlings or rising gases are likely to accumulate and produce the problems mentioned at the beginning of this description. Thus, in any heater coil arrangement where the fluid ascends and rises in a closed path as it courses through the coil, the new vent and drain conduit systems may be coupled with the uppermost and lowermost portions of the coils to provide continuously flushed vent and drain systems.

Although a preferred embodiment of the invention has been described in considerable detail, such description is intended to be illustrative rather than limiting, for the invention may be variously embodied and is to be limited only by construing the claims which follow.

I claim:

1. A fluid heater comprising:
   a. helical coil means formed of tubing to define a continuous flow path, the axis of said coil means being disposed such that the loops comprising said coil means have upper and lower portions whereby gases in said coil means rise to the upper portions of said loops when liquid is delivered to said coil means,
   b. one of said loops having inlet means for receiving fluid to be heated and another of said loops having outlet means for fluid and a plurality of loops disposed therebetween and defining said flow path,
   c. vent conduit means disposed above said upper loop portions and having an outlet connected to said outlet means for said coil means and a plurality of inlets each connecting said vent conduit means with a different one of the upper portions of said coil loops, whereby said vent conduit means defines a flow path in parallelism with said coil means for conducting a part of the fluid received by said coil means, and vent means connected to said vent conduit means for venting gases therefrom.

2. A heat transfer fluid heater comprising:
   a. a furnace chamber defining a heating zone,
   b. helical coil means formed of tubing, the axis of said coil means being disposed generally horizontal such that the loops comprising said coil means have upper and lower portions, said coil means being for conducting fluid to absorb heat from said heating zone and said coil means having an outlet means for discharging heated fluid and inlet means for receiving fluid from which heat has been extracted,
   c. pump means external of said heating zone and having an outlet communicated with said coil inlet means and an inlet for receiving fluid from which heat has been extracted, and
   d. drain conduit means having an inlet in communication with said coil inlet means for receiving fluid at substantially the pressure at said pump outlet and said drain conduit means having a plurality of outlets in communication with said lower portions of said coil loops to provide for continuously flowing through said drain means a proportionate part of the fluid delivered to said coil means to thereby continuously flush said drain conduit means.

3. The apparatus set forth in claim 2 wherein:
   a. said drain conduit means comprises a tubular means having a sinuous configuration.

4. A heat transfer fluid heater comprising:
   a. a furnace chamber defining a heating zone,
   b. helical coil means formed of tubing, the axis of said coil means being disposed generally horizontal such that the loops comprising said coil means have upper and lower portions, said coil means being for conducting fluid to absorb heat from said heating zone and said coil means having an outlet means for discharging heated fluid and inlet means for receiving fluid from which heat has been extracted,
   c. pump means external of said heating zone and having an outlet communicated with said coil inlet and an inlet for receiving fluid from which heat has been extracted, and d. said coil means having a first loop at the inlet end thereof, a plurality of intermediate loops and a last loop at the outlet end thereof, e. drain conduit means having a plurality of inlets communicated with the lower portions of said intermediate and last loops and an outlet communicated with the inlet of said pump means to provide for continuously flowing fluid from said lower portions through said drain conduit means to thereby continuously flush said drain conduit means.

5. A fluid heater comprising:

first means for defining a path for fluid to flow while absorbing heat, said path including upper and lower portions and inlet means for receiving fluid from a source of fluid and outlet means for said fluid, drain conduit means communicating with one of said inlet means and said outlet means and comprising tubular means having a sinuous configuration and having an inlet communicating with said inlet means of said first means, means for communicating said drain conduit means with said lower portions of said first means and constituting outlets for said drain conduit means for a proportionate part of the fluid delivered to said first means to flow continuously through said drain conduit means.

6. A fluid heater comprising:

first means for defining a path for fluid to flow while absorbing heat, said path including upper and lower portions and inlet means for receiving fluid from a source of fluid and outlet means for said fluid, drain conduit means communicating with one of said inlet means and said outlet means and comprising a tubular means having a sinuous configuration and having an outlet communicating with said outlet means of said first means, means for communicating said drain conduit means with said lower portions of said first means and constituting inlets to said drain conduit means for a proportionate part of the fluid delivered to said first means to flow continuously through said drain conduit means.

7. A fluid heater comprising:

first means for defining a path for fluid to flow while absorbing heat, said path including upper and lower portions and inlet means for receiving fluid from a source of fluid and outlet means for said fluid, drain conduit means communicating with one of said inlet means and said outlet means, means for communicating said drain conduit means with said lower portions of said first means for a proportionate part of the fluid delivered to said first means to flow continuously through said drain conduit means, vent conduit means comprising a tubular means having a sinuous configuration and having an outlet communicating with said oulet means of said first means for defining a fluid flow path, and means communicating said upper portions with said vent conduit means and constituting inlets of said vent conduit means for a proportionate part of said fluid delivered to said first means to flow continuously through said vent conduit means.

8. A fluid heater comprising:

a. helical coil means formed of tubing, the axis of said coil means being disposed such that the loops comprising said coil means have upper and lower portions, b. at least one of said loops having inlet means for receiving fluid to be heated and at least another one of said loops having outlet means for fluid that is exposed to heat while flowing through said coil means, c. vent conduit means comprising tubular means having a generally serpentine configuration and disposed above said upper portions and having an outlet communicating with said outlet means for said coil means and a plurality of inlets communicating with the upper portions, respectively, of said coil loops, whereby said vent conduit means will conduct a part of the fluid received by said coil means.

9. The fluid heater set forth in claim 8 including:

a. tubular means extending upwardly from said upper portions of said coil loops and joining said vent conduit means to thereby provide said communication between said coil loops and said vent conduit means.

10. A fluid heater comprising:

helical means formed of tubing, the axis of said coil means being disposed such that the loops comprising said coil means have upper and lower portions, at least one of said loops having inlet means for receiving fluid to be heated and at least another one of said loops having outlet means for fluid that is exposed to heat while flowing through said coil means, drain conduit means comprising tubular means having a sinuous configuration and disposed below said lower portions and having an inlet communicating with said inlet means for said coil and plural outlets communicating with said lower portions, respectively, whereby said drain conduit means will conduct a proportionate part of the fluid received by said coil means.

11. A fluid heater comprising:

helical coil means formed of tubing, the axis of said coil means being disposed such that the loops comprising said coil means have upper and lower portions, at least one of said loops having inlet means for receiving fluid to be heated and at least another one of said loops having outlet means for fluid that is exposed to heat while flowing through said coil means, drain conduit means disposed below said lower portions and having an outlet in communication with said outlet means of said coil means and a plurality of inlets communicating said conduit means with said lower portions of said coil loops, said plurality of inlets comprising tubular means extending downwardly from said lower portions to said drain conduit means whereby said drain conduit means will receive a proportionate part of said fluid from said coil means to thereby continuously flush and drain conduit means.

12. The invention set forth in claim 11 and including vent conduit means disposed above and being coupled to the upper portion of each of said loops to define a first flow path above said coil for conducting a second part of the fluid which is delivered to said coil means in a parallel relation with respect thereto.

13. The invention set forth in claim 12 and including a drain connected to said drain conduit means for draining fluid therefrom and vent means connected to said vent conduit means for venting gases therefrom.

14. The invention set forth in claim 13 and including:
a furnace chamber defining a heating zone,
said helical coil means being disposed within said heating zone, and pump means external of said heating zone and having an outlet connected to said inlet means and having an inlet for receiving returned fluid from said outlet means.

15. A fluid heater comprising:
helical coil means formed of tubing, the axis of said coil means being disposed such that the loops comprising said coil have upper and lower portions,
at least one of said loops having inlet means for receiving fluid to be heated and at least another one of said loops having outlet means for fluid that is exposed to heat while flowing through said coil means,
drain conduit means comprising tubular means having a sinuous configuration and disposed below said lower portions and having an outlet in communication with said outlet means of said coil means and a plurality of inlets communicating said conduit means with said lower portions of said coil loops, whereby said drain conduit means will receive a proportionate part of said fluid from said coil means to thereby continuously flush said drain conduit means.

16. A heat transfer fluid heater comprising:
a furnace chamber defining a heating zone,
helical coil means formed of tubing, the axis of said coil means being disposed generally horizontal such that the loops comprising said coil means have upper and lower portions, said coil means being for conducting fluid to absorb heat from said heating zone and said coil means having an outlet means for discharging heated fluid and inlet means for returning fluid from which heat has been extracted,
pump means external of said heating zone and having an outlet communicated with said coil inlet means and having an inlet for receiving returned fluid, and
vent conduit means comprising tubular means having a sinuous configuration and having an outlet in communication with said coil outlet means and a plurality of inlets communicated respectively with said upper portions of the loops comprising said coil means to provide for continuously flowing through said vent conduit means a proportionate part of the fluid that is delivered to said coil means to thereby continuously flush said vent conduit means.

17. A fluid heater comprising:
generally helical coil means formed of a tubular material and having a plurality of loops arranged generally vertically and between an inlet loop and an outlet loop to define a continuous path for fluid to flow while absorbing heat, said coil means being arranged with each of its individual loops oriented with a first portion in an elevated position and a second portion depressed whereby gases tend to flow to the first portion of each loop and the liquid in each loop tends to flow downwardly to the second portion thereof,
said coil means including inlet means connected to said inlet loop for receiving fluid to be heated from a source of fluid and outlet means connected to said outlet loop for returning fluid to said source,
vent conduit means disposed above and being coupled to the first portion of each of said loops to define a first flow path above said coil for conducting a part of the fluid which is delivered to said coil means in a parallel relation with respect thereto,
drain conduit means disposed below the second portions of said loops and being connected to the lower portions of each coil loop whereby said drain conduit means defines a second flow path below said coil for conducting fluid in parallel relation thereto,
said vent conduit means and said drain conduit means being spaced respectively above and below the first and second loop portions,
a first plurality of conduits connecting the first portion of each loop to said vent conduit at spaced apart points thereof and a second plurality of conduits connecting the second portion of each loop to said drain conduit at spaced apart points thereof,
said vent conduit means and said drain conduit means being configured nonlinearly between the respective points of connection with said first and second plurality of conduits to permit expansion and contraction of said vent and drain conduits.

18. The fluid heater set forth in claim 17 wherein said drain and vent conduit means each comprise tubular means having a generally sinuous configuration.

19. The invention set forth inclaim 18 and including drain means connected to said drain conduit means for draining fluid therefrom and vent means connected to said vent conduit for venting gases therefrom.

20. A fluid heater comprising:
coil means formed of a tubular material and having a plurality of loops arranged between an inlet loop and an outlet loop to define a continuous path for fluid to flow while absorbing heat, said coil means being arranged with each of its individual loops oriented with a first portion in an elevated position and a second portion depressed whereby gases tend to flow to the first portion of each loop and the liquid in each loop tends to flow downwardly to the second portion thereof,
said coil means including inlet means connected to said inlet loop for receiving fluid to be heated from a source of fluid and outlet means connected to said outlet loop for returning fluid to said source,
vent conduit means disposed above and being coupled to the first portion of each of said loops to define a first flow path above said coil means for conducting a part of the fluid which is delivered to said coil means in a parallel relation with respect thereto,
drain conduit means disposed below the second portions of said loops and being connected to the lower portions of each coil loop whereby said drain conduit means defines a second flow path below said coil means for conducting fluid in parallel relation thereto, said vent conduit means and said drain conduit means being spaced respectively above and below the first and second loop portions,
a first plurality of conduits connecting the first portion of each loop to said vent conduit means at spaced apart points thereof and a second plurality of conduits connecting the second portion of each loop to said drain conduit means at spaced apart points thereof, said vent conduit and said drain conduit means being configured non-linearly between the respective points of connection with said first and second plurality of conduits to permit expansion and contraction of said vent and drain conduit means.

21. The invention set forth in claim 20 and including drain means connected to said drain conduit means for draining fluid therefrom and vent means connected to said vent conduit means for venting gases therefrom.

22. A heat transfer fluid heater comprising:

a furnace chamber defining a heating zone, helical coil means formed of a tubular material and having a plurality of loops arranged between an inlet loop and outlet loop, said coil have upper and lower portions, said coil being constructed and arranged for conducting fluid to absorb heat from said heating zone and said coil having an outlet means connected to said oulet loop for discharging heated fluid and inlet means connected to said inlet loop for returning fluid from which heat has been extracted, pump means external of said heating zone and having an outlet communicated with said inlet means and having an inlet for receiving returned fluid, and vent conduit means disposed above said coil means and having an outlet in communication with said coil outlet means and a plurality of spaced apart inlets each respectively connected to the upper portion of one coil loop to provide a first flow path parallel to said coil means for continuously flowing through said vent conduit means a proportionate part of the fluid that is delivered to said coil means to thereby continuously flush said vent conduit means, drain conduit means disposed below said coil means and in communication with said coil inlet means for receiving fluid at from said pump outlet, said drain conduit means having a plurality of spaced apart outlets each respectively connected to the lower portion of one coil loop to provide a second flow path parallel to said coil means for continuously flowing through said drain conduit means a proportionate part of the fluid delivered to said coil means to thereby continuously flush said drain conduit means, said vent conduit means and said drain conduit means being configured nonlinearly between the respective points of connection with said coil loops to permit expansion and contraction of said vent and drain conduit means.

* * * * *